Jan. 15, 1963  J. W. PACKARD  3,073,210
PRISMATIC REFLECTING DEVICE
Filed Jan. 19, 1959  2 Sheets-Sheet 1
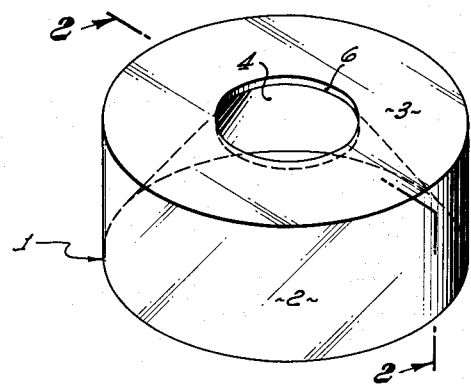
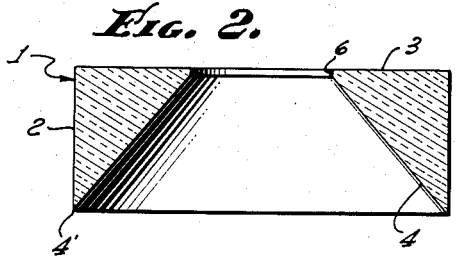
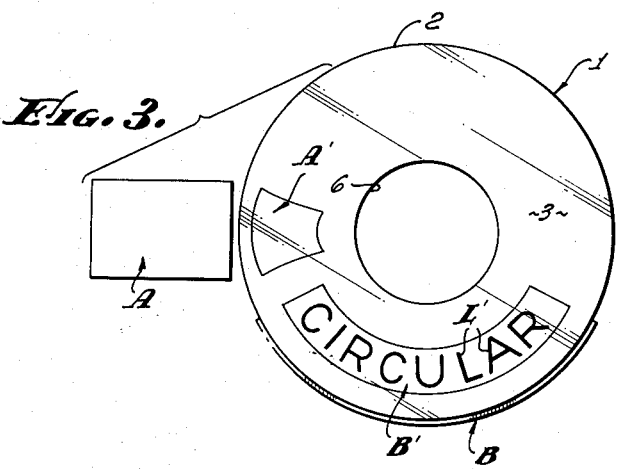
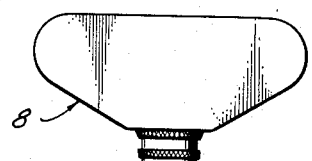
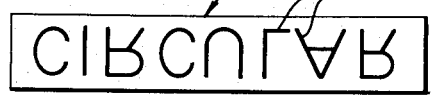
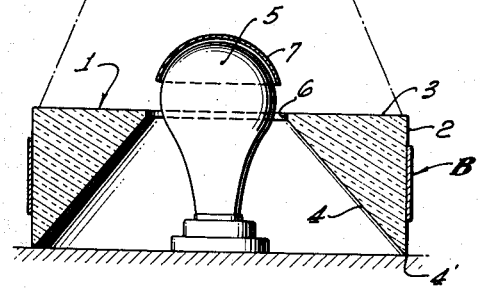
INVENTOR.
JOSEPH W. PACKARD
BY
Paul A. Weilein
ATTORNEY.

Jan. 15, 1963  J. W. PACKARD  3,073,210
PRISMATIC REFLECTING DEVICE
Filed Jan. 19, 1959  2 Sheets-Sheet 2
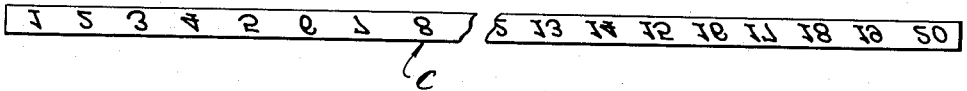
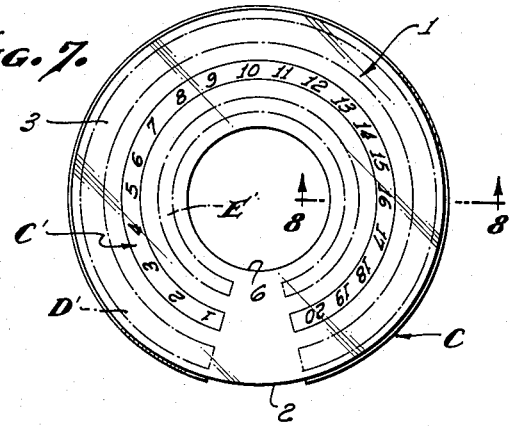
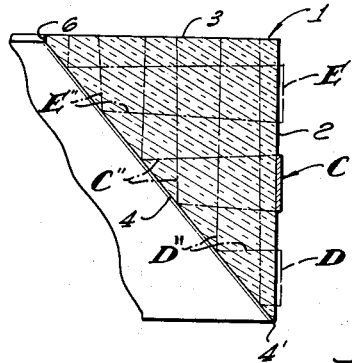
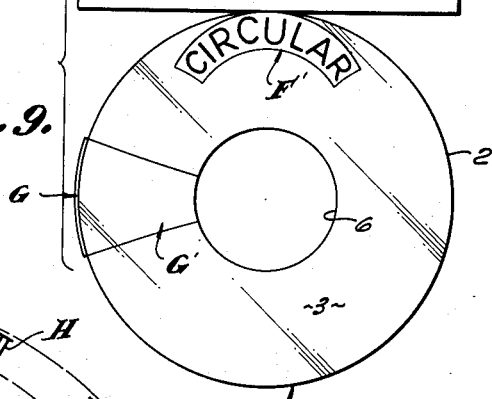
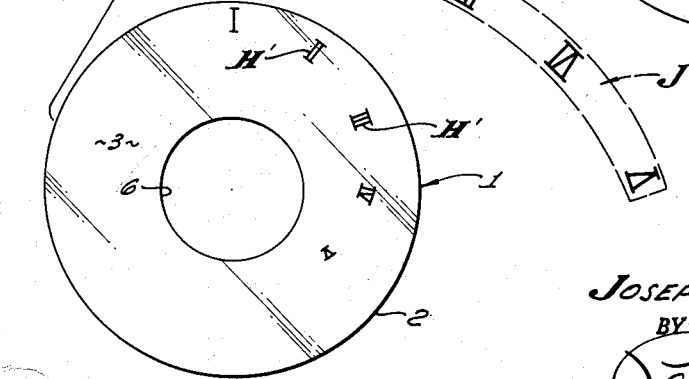
INVENTOR.
JOSEPH W. PACKARD
BY
Paul A. Weilein
ATTORNEY.

United States Patent Office 3,073,210
Patented Jan. 15, 1963

3,073,210
PRISMATIC REFLECTING DEVICE
Joseph W. Packard, 5936-B Stafford,
Huntington Park, Calif.
Filed Jan. 19, 1959, Ser. No. 787,648
5 Claims. (Cl. 88—1)

This invention relates to optical instruments and more particularly to a prismatic reflecting device.

It is an object of this invention to provide a prismatic reflecting device by means of which a variety of modified images of letters, numerals, designs and objects readily may be produced and photographically recorded to create distinctive styles and appearances of the letters, numerals, designs and objects for reproduction as desired, as for example, in the production of printing plates used for illustration and advertising purposes in newspapers, magazines or other printed matter.

It is another object to provide a prismatic reflecting device which may be used to produce arcuate or circular images as well as other modified images of lineal indicia or indices having coordinates in lineal or other order whereby such images may be photographically recorded for subsequent reproduction. In the case of photographic recording of such images for the reproduction thereof for advertising purposes or for the reproduction thereof for making cicular, curved or other shaped scales or dials having coordinates in arcuate, circular or modified order, printing plates of the images readily may be made from the photographic records thereof by any known process.

It is another object hereof to provide a reflecting device such as described which will make it unnecessary to employ the services of artists or draftsmen to produce various modified, fanciful or unique letter or numeral styling or certain curved, circular or other forms of indicia that are capable of being produced by the reflecting device. This makes it possible to produce printing plates at a lower cost than where the services of artists or draftsmen are employed to create particular styling or designs.

It is another object hereof to provide a reflecting device wherein an optical reflecting element, a light source and a camera are combined to form a novel unit for making records of various reflected images produced by the reflecting element.

A further object of this invention is to provide reflecting means which makes it possible to inspect and make records of the interior surfaces of cylinders, tubes, pipes and the like.

It is another object of this invention to provide a prismatic reflecting devices which will achieve the objects and advantages herein noted in a novel manner by reason of being in the form of an annular body of optical material having a cylindrical outer surface, a flat annular upper surface normal to the cylindrical outer surface, and in having a conical inner surface which converges from the lower edge of the cylindrical outer surface to the inner edge of the annular upper surface. With this arrangement of surfaces, modified images of indicia or objects placed adjacent or on said cylindrical outer surface, will be reflected so as to be visible on the upper surface in various forms, dependent upon the positions in which the indicia or objects are held or disposed relative to the cylindrical outer surface.

Other objects and advantages of the invention will be hereinafter described or will become apparent to those skilled in the art and the novel features of the invention will be defined in the appended claims.

Referring to the drawings:

FIG. 1 is a perspective view of a prismatic reflecting device embodying the present invention;

FIG. 2 is a transverse sectional view taken on the line 2—2 of FIG. 1;

FIG. 3 is a top plan view of the device showing typical modified images of objects or indicia as they would appear when looking down upon the upper surface of the device;

FIG. 4 is a top plan view of the strip of indicia that is shown in FIG. 3 as placed in arcuate form upon the cylindrical outer surface of the prismatic device;

FIG. 5 is a schematic view of the prismatic device as it would appear when combined with a light source and a camera for photographing the images reflected by the device, the prismatic device being shown in section;

FIG. 6 is a plan view of a typical lineal measuring element subject to being positioned to produce the modified images thereof shown in FIG. 7;

FIG. 7 is a top plan view of the reflecting device showing how various modified images of the element shown in FIG. 6 may be had according the the position of the element;

FIG. 8 is an enlarged fragmentary sectional view taken on the line 8—8 of FIG. 7, and indicating how the measuring element shown in FIG. 6 may be variously position to produce different modified images thereof;

FIG. 9 is a top plan view of the reflecting device showing how objects of different form may be positioned with respect to the reflecting device to produce modified images thereof; and FIG. 10 is a top plan view of the reflecting device schematically showing the modified helical image as produced by positioning objects vertically in a helical pattern opposite or against the cylindrical wall of the device.

As shown in the accompanying drawings, a prismatic reflecting device embodying the present invention includes an optical element in the form of an annular body 1 made of any suitable optical material such as clear transparent plastic material, glass or the like.

In accordance with this invention, the annular body 1 has a cylindrical outer surface 2, a flat annular top or upper surface 3 normal to the cylindrical surface 2, and is formed with conical inner surface 4 converging from the lower edge of the cylindrical outer surface 2 to the inner edge of the flat annular upper surface 3. This formation and arrangement produces what may be termed an annular prismatic optical element wherein the lower extremities of the conical inner surface 4 and the cylindrical outer surface 2 merge and intersect to form an annular edge 4' common to such surfaces and serving as the base of the device. Each of the surfaces 2, 3, and 4 is highly polished to enhance the reflective qualities of the device.

In the use of the device, the annular body 1 is placed with the edge or base 4' resting upon any suitable supporting surface, not shown, so that the cylindrical surface 2 is upright and the surface 3 is uppermost.

FIGS. 3, 5, 7, 8, 9 and 10 illustrate how indicia or objects placed alongside, adjacent or on the cylindrical surface 2 will be reflected so that modified images thereof will be visible on the top or upper surface 3. The degree of modification or distortion of the images depends on the position of the indicia or object with respect to the cylindrical surface.

As shown in FIG. 3, if a rectangular object A is placed so as to lie flat alongside the outer cylindrical surface 2 of the reflecting device and radial to the axis thereof, the modified reflected image A' thereof will appear on the upper annular surface 3 with the longitudinal edges of the image converging toward the axis of the device. The transverse edges of the image appear as arcuate and substantially concentric lines.

FIG. 4 shows an elongated flexible strip B on which are printed letters L in upside down and reversed order. When this strip B is placed against the outer surface 2 of the device as shown in FIG. 3, for example, about midway of the upper and lower edges of the surface 2, the image B' will appear on the upper surface 3 as an arcuate strip on which the images L' of the letters L are disposed in an arcuate order to spell the word "Circular."

If the indicia to be reflected consists of printed matter having letters in proper order to spell words, the modified images thereof appearing on the upper surface 3 will be reversed, but when finished suitable photographic records thereof are made, the letters will be presented in the usual manner to proper order. Accordingly, printing plates may be made in any well-known manner from the finished photographic record showing the letters in proper order, such plates being used in printing newspapers, magazines, and other matter, for illustration and advertising purposes.

FIGS. 6, 7 and 8 show how a straight index or element scale C with coordinates extending lineally as shown in FIG. 6, can be reflected to produce arcuate or circular images by placing the straight flexible element C against the cylindrical surface 2 of the body 1. FIGS. 7 and 8 show in full lines how the element C when wrapped around the mid portion of the cylindrical surface 2, as shown in FIG. 8, will produce the circular image C', as seen in FIG. 7, of a particular diameter.

When the element C is placed at the lower end of the cylindrical surface 2, while wrapped therearound as shown at D in the dotted lines in FIG. 8, the resultant circular image D' shown in dotted lines in FIG. 7 is of larger diameter than the image C'.

An image E' as shown in FIG. 7 of smaller diameter than the images C' and D' will be produced by placing the element C near the upper end of the cylindrical surface 2 in the position indicated in dotted lines at E in FIG. 8. The intersecting dotted lines C", D" and E" shown in FIG. 8 indicate the reflection paths of the element C when the latter is placed at different levels.

It will now be apparent that modification of the images of an object disposed on or near the cylindrical surface 2, as here shown, may be varied as desired by varying the location of the object as well as the position thereof with respect to the upper and lower ends of this cylindrical surface. The images are smaller when the member is nearer to the upper end of the cylindrical surface 2 and are enlarged as the member is lowered relative to the cylindrical surface. Likewise, the spacing of the coordinates shown in the images is varied in proportion to the size of the image.

FIG. 9 illustrates how the lettered strip F, corresponding to the strip B shown in FIG. 4, if placed flatwise to one side of the cylindrical surface 2 of the device will produce on the upper surface 3 the reduced and arcuate image F'. FIG. 9 also illustrates how a rectangular object G if placed vertically against the cylindrical surface 2 will produce on the upper surface 3 the modified segmental image G' wherein the longitudinal edges converge.

FIG. 10 schematically illustrates how the Roman characters H or other objects on a flexible strip J or otherwise supported, if placed vertically adjacent or on the cylindrical surface 2 at different levels in a helical pattern, will produce the fanciful modified images H' on the upper surface 3 of the reflecting device.

It will now be obvious that many images, modified in ways other than here shown, may be produced with the optical element of this invention by simply varying the position of the object to be reflected with respect to the cylindrical surface 2.

It is desired that a source of light be provided in order that the sharp images will be revealed in a manner making possible photographic recordings thereof. For this purpose an electric light bulb 5, as here shown, is positioned in the central opening 6 of the annular body 1 so as to project above the upper surface 3. The top of the light bulb may be silvered to act as a reflector or, as here shown, a reflector 7 may be used. In either case, the reflecting medium will cause light from the bulb 5 to be directed downwardly into the body 1 from whence it is reflected outwardly from the outer wall 2 so as to illuminate the indicia or object placed adjacent or against the cylindrical surface 2. This will cause a clearly outlined image of the indicia or object to be visible when looking down upon the upper surface 3.

In order that a photographic record may be made of the reflected images, a camera 8 is positioned directly over the upper surface 3 of the body 1. This camera may be held by any suitable means, not shown, in this position or it may, with suitable means, also not shown, be connected with the body 1 so that the body, the bulb and reflector will constitute a portable unit.

With the camera positioned as here shown, it is apparent that the desired photographic records may be made of any image visible on the upper surface 3. Printing plates readily may be produced in any known manner from finished photographic records of the images, such plates being used for the purposes hereinbefore noted.

It is important to note that the annular prismatic optical element of this invention makes it possible to inspect, also photographically record, the interior surfaces of cylindrical members, tubes, and the like. It is thought unnecessary to illustrate the obvious way in which the optical element, source of light and camera may be positioned to effect this use of the device of this invention, since it has been pointed out and illustrated how objects opposite or against the cylindrical outer surface 2 will be reflected so that images thereof will appear on the flat surface 3 of the annular body 1. Thus, a camera focused on the surface 3 readily may be operated to record images thereon.

While specific structural details have been shown and described, it should be understood that changes and alterations may be resorted to without departing from the spirit of the invention as defined in the appended claims.

I claim:

1. A prismatic reflecting device comprising: a body of optical material having a cylindrical outer surface; said body having a through opening axially thereof; the entire upper surface of said body being normal to said cylindrical surface and disposed between said opening and said cylindrical surface; said through opening defining a conical surface converging from the lower edge of said cylindrical surface toward said annular upper surface; the relative arrangement of said surfaces causing to be visible at said upper surface the reflection of an object placed adjacent or on said cylindrical outer surface.

2. A prismatic reflecting device comprising: an annular body of optical material having a cylindrical outer surface; a conical inner surface; and a flat annular upper surface normal to said cylindrical surface; means providing a source of light surrounded by said body and disposed above said upper surface in position to illuminate indicia placed adjacent said cylindrical surface.

3. A reflecting device comprising: a cylindrical body of optical material having an opening extending axially therethrough; said body having a cylindrical outer surface; said opening forming within said body a reflecting surface in the form of a frustum of a cone; and said body having a flat annular surface disposed between said opening and said cylindrical surface.

4. A reflecting device comprising: an annular body of optical material having a cylindrical outer surface; a conical inner surface; a flat annular upper surface normal to said outer surface; said inner surface defining an opening extending axially through said annular body; and a source of light mounted in said opening and extended above said upper surface for directing light rays downwardly into said body and out through said cylindrical surface to illuminate an object placed on or adjacent said cylindrical surface.

5. A reflecting device comprising: an annular body of optical material having a cylindrical outer surface; a conical inner surface; a flat annular upper surface normal to said outer surface; said inner surface defining an opening extending axially through said annular body; and a source of light extending above said upper surface for directing light rays downwardly into said body and out through said cylindrical surface to illuminate an object placed on or adjacent said cylindrical surface.

References Cited in the file of this patent

UNITED STATES PATENTS

| | | |
|---|---|---|
| 888,236 | Hattu | May 19, 1908 |
| 1,658,509 | Beebe | Feb. 7, 1928 |
| 2,173,316 | Sproule | June 30, 1937 |
| 2,244,235 | Ayres | June 3, 1941 |
| 2,299,682 | Conant | Oct. 20, 1942 |
| 2,430,616 | Pearson | Nov. 11, 1947 |
| 2,696,550 | Neugass | Dec. 7, 1954 |
| 2,846,970 | Dupree | Aug. 12, 1958 |

FOREIGN PATENTS

| | | |
|---|---|---|
| 704,471 | France | Feb. 23, 1931 |